UNITED STATES PATENT OFFICE.

ANDREW DERROM, OF PATERSON, NEW JERSEY.

COMPOSITION MASTIC FOR COVERING ROOFS, TELEGRAPH-WIRES, AND THE LIKE.

SPECIFICATION forming part of Letters Patent No. 315,487, dated April 14, 1885.

Application filed April 15, 1884. (Specimens.)

*To all whom it may concern:*

Be it known that I, ANDREW DERROM, a resident of Paterson, in the county of Passaic and State of New Jersey, have invented an Improved Composition Mastic for Covering Roofs, Telegraph-Wires, and the Like, of which the following is a full, clear, and exact description.

This invention relates to a new plastic composition for covering roofs, telegraph-wires, and electric-light wires, so as to give them perfect insulation in air, underground, or in the water, and for other purposes.

The invention consists of the following ingredients compounded in about the proportions stated, to wit: forty parts, by measure, of hard crude Trinidad or other asphaltum; two parts of beeswax; two parts of linseed-oil, and two parts of crude cotton-seed oil. These ingredients are boiled together, stirred, and then applied as a covering wherever required. The composition is a good non-conductor of electricity, is not softened by ordinary summer heat, nor caused to crack by frost. One part of cocoanut-oil, one part of paraffine, and one part of tallow may be added, if desired; but the best results have been obtained from the use of the hard crude Trinidad asphaltum, forty parts; beeswax, two parts; two parts of linseed-oil, and two parts of cotton-seed oil. The hard crude Trinidad asphaltum is a species of asphaltum which possesses characteristics which distinguish it for the purposes stated most advantageously from any other asphaltum known in the arts.

I claim—

The bituminous mastic composition, consisting of hard crude Trinidad asphaltum, beeswax, and oil, in the proportions specified.

ANDREW DERROM.

Witnesses:
WILLY G. E. SCHULTZ,
HARRY M. TURK.